June 16, 1953 C. M. MAYER 2,642,132
INDICATOR FOR COOKING RANGE OVENS
Filed Nov. 19, 1948 2 Sheets-Sheet 1

INVENTOR.
Charles M. Mayer
BY Chas. H. Trotter
Atty.

June 16, 1953  C. M. MAYER  2,642,132
INDICATOR FOR COOKING RANGE OVENS
Filed Nov. 19, 1948  2 Sheets-Sheet 2

INVENTOR.
Charles M. Mayer
BY Chas. H. Trotter
Atty.

Patented June 16, 1953

2,642,132

UNITED STATES PATENT OFFICE 2,642,132

INDICATOR FOR COOKING RANGE OVENS

Charles M. Mayer, Mansfield, Ohio, assignor to The Tappan Stove Company, Mansfield, Ohio, a corporation of Ohio Application November 19, 1948, Serial No. 61,106

6 Claims. (Cl. 158—122)

This invention relates to an indicator by which one can tell at a glance whether or not the oven burner of a gas cooking range is ignited.

In the better grades of gas cooking ranges the supply of gas to the oven burner is controlled by a thermostatically operated valve by which any desired temperature may be maintained in the oven. In some ranges a constantly burning pilot burner is provided adjacent the oven burner by which the burner is automatically ignited when the gas is turned on. In other ranges the oven burner must be manually ignited each time the oven is used. Where a constantly burning pilot burner is used a safety control valve is also provided through which the supply of gas to both the pilot burner and the oven burner is automatically cut off in the event the pilot burner becomes extinguished for any reason. The control valve must then be re-set and held until the pilot burner is again burning normally. A thermostatic element or a thermocouple against which the pilot burner burns maintains the control valve open as long as the pilot burner is burning.

My indicator is adapted for use with ranges having either manually or automatically ignited burners. The indicator comprises an electric bulb, mounted preferably on the splash-back of the range where it is always clearly visible, which is energized while the burner is ignited. The energization of the bulb is controlled by a switch which is adapted to be opened and closed by a thermostatic element. The operation of the thermostatic element is controlled by an indicating pilot burner which is disposed adjacent the rear end of the oven burner, which extends from the front to the rear of the oven. The indicating pilot burner is arranged to be ignited from the oven burner and to project a small flame against the thermostatic element. The oven burner is ignited at the forward end thereof, either automatically by a constantly burning ignition pilot burner when the gas is turned on, or manually through an igniter tube. The small flame from the indicating pilot burner in contact with the thermostatic element causes the thermostatic element to close the switch and to maintain it closed as long as the flame is burning. This energizes the bulb and indicates that the oven burner is ignited. By arranging the ignition means at one end of the oven burner and the indicating pilot burner at the other end thereof, the bulb cannot be energized until the oven burner is completely ignited since the flame will travel from the front to the rear of the oven burner and the indicating pilot burner cannot be ignited until the flame reaches the rear end of the oven burner. The supply of gas to the oven burner and the indicating pilot burner is controlled by a valve which simultaneously cuts the supply of gas to both these burners on and off. From this valve the gas flowing to the oven burner first passes through a thermostatically operated valve which is adapted to maintain the temperature in the oven at any predetermined degree. When the oven burner is turned off, the thermostatic element cools, since the indicating pilot burner is also turned off, and opens the switch which de-energizes the bulb thus indicating that the oven burner has been extinguished. When the oven burner is ignited manually, the indicating pilot burner also acts as an ignition pilot burner to relight the oven burner in case it becomes extinguished after being initially ignited. This sometimes happens when the gas pressure is low and the thermostatically operated valve operates to cause the oven burner to burn with a very low flame.

When automatic ignition means in the form of a constantly burning pilot burner is provided a safety control is also provided. This safety control is arranged to automatically cut off the supply of gas to the oven burner, the indicating pilot burner and the ignition pilot burner in the event the ignition pilot burner should become extinguished for any reason. This will also operate to de-energize the bulb which will indicate that something has happened to extinguish the oven burner. After the ignition pilot burner has been extinguished the safety control must be manually operated to supply gas to the ignition pilot burner. Then after the ignition pilot burner has been ignited and is burning normally, the control will operate to again supply gas to the oven burner and the ignition pilot burner.

The principal object of my invention is to provide a simple and efficient indicator by which one can tell at a glance whether or not an oven burner is operating.

Other and more limited objects of the invention will be apparent from the following specification and the accompanying drawing forming a part thereof wherein.

Figure 1:
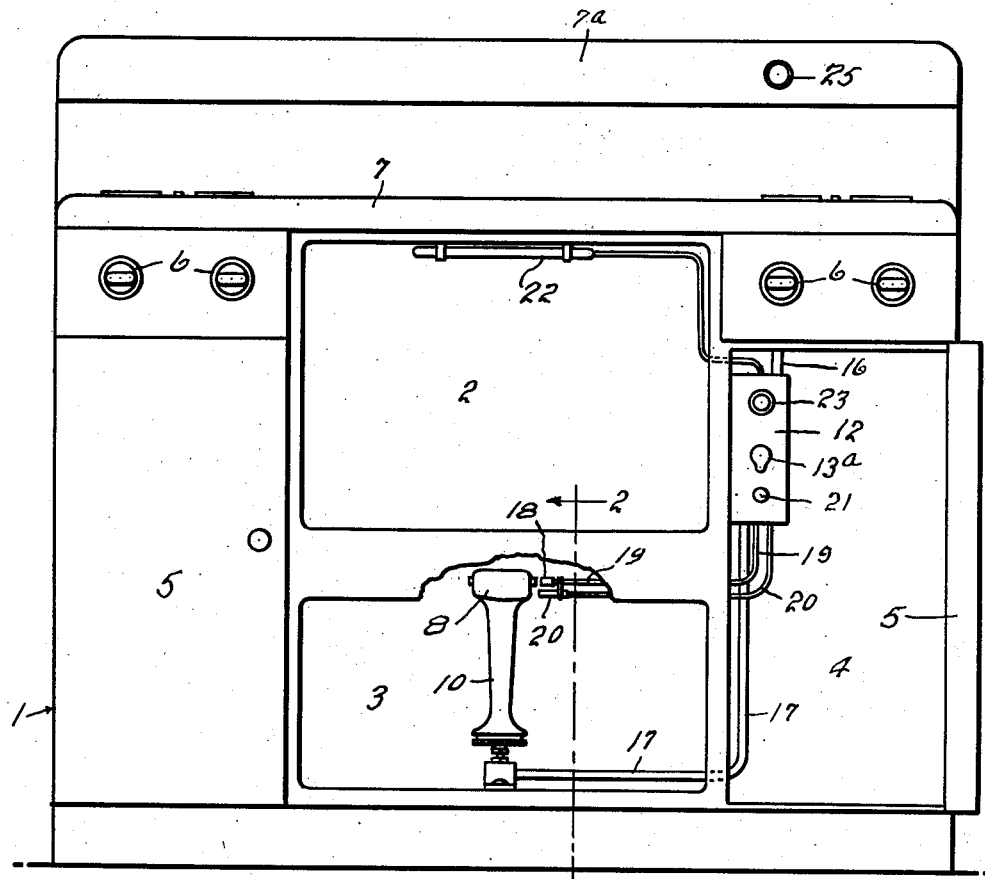
Fig. 1 is a front elevation of a cooking range having my invention embodied therein. The doors of the oven and broiler compartments have been removed and the door to one of the storage compartments is shown in the open position in order to show mechanism in these compartments.
Figure 4:
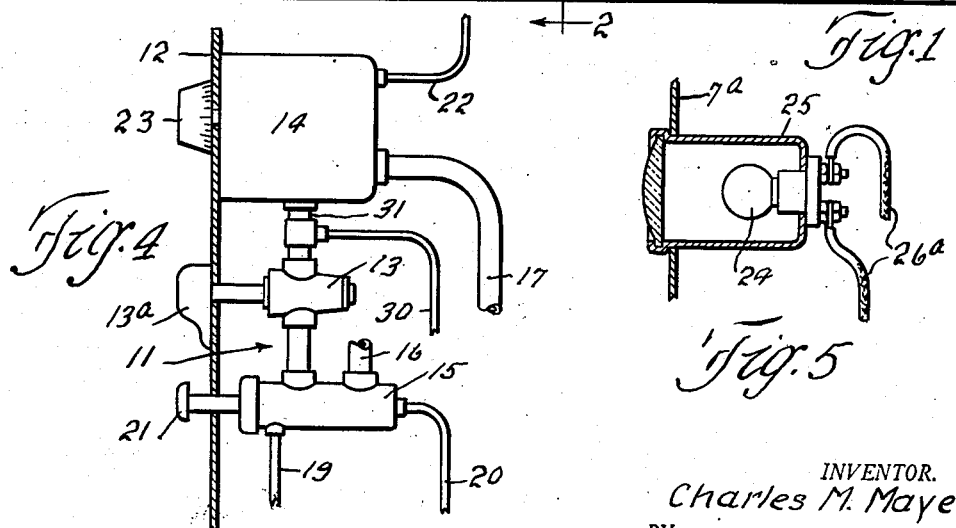
Fig. 4 is a side elevation of the burner control mechanism.
Figure 5:
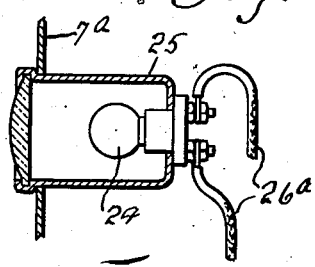
Fig. 5 is an enlarged section taken on the line 5—5 of Fig. 1.
Figure 2:
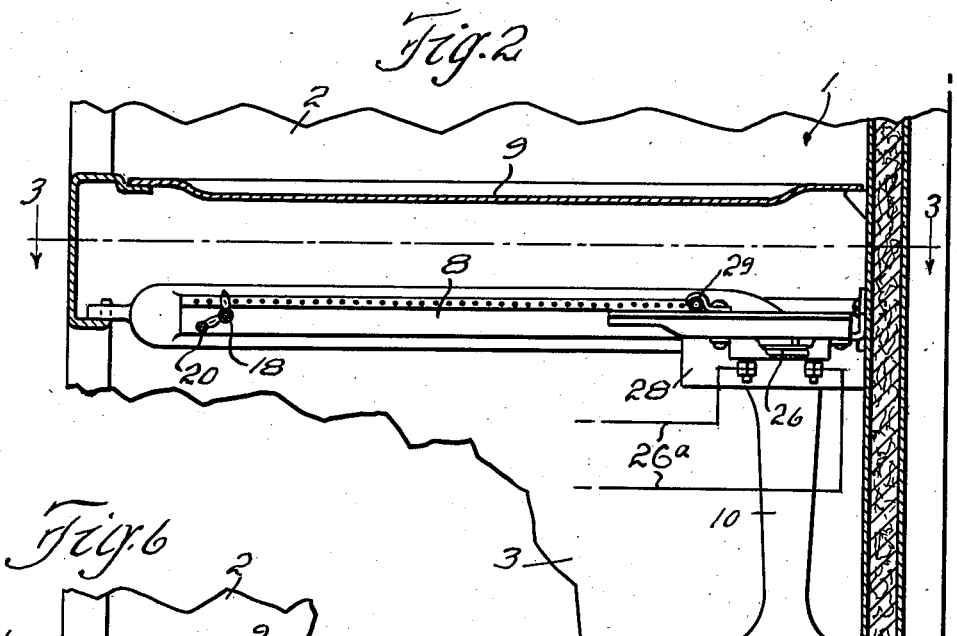
Fig. 2 is a fragmentary vertical section taken on the line 2—2 of Fig. 1.

Referring to the drawings by reference characters, the numeral 1 indicates generally a cooking range having an oven compartment 2 and a broiler compartment 3 therebelow. There is a storage compartment 4 at each side of the oven and broiler compartments which are closed by suitable doors 5. The range has the usual top burners which are controlled by valves 6. Secured to and extending up from the rear edge of the stove top 7 is a splash-back 7ª of any desired construction.

A gas burner 8 by which the oven 2 is heated is mounted in the broiler compartment 3 below the oven bottom 9, and extends from the front to the rear of the compartment. The rear end of the burner is connected to a mixing tube 10 which extends downwardly from the burner, and through which a combustible mixture of gas and air is supplied to the burner. The operation of the oven burner 8 is controlled by suitable mechanism, generally indicated by the numeral 11, which is mounted on a plate 12 rigidly secured within one of the storage compartments 4. The burner control mechanism 11 comprises a cock 13, a thermostatically operated valve unit 14 and a safety control 15, all of which are of standard construction, and consequently are not illustrated in detail herein. When the cock 13 is turned by the handle 13ª to admit gas to the burner 8 the gas flows from a suitable supply manifold through a pipe 16 to the safety control 15. From the safety control unit 15 the gas flows through the cock 13 and into the thermostatically operated valve unit 14 and from there through the pipe 17 to the mixing tube 10 and into the burner 8. The gas is automatically ignited by a constantly burning pilot burner 18 which is disposed adjacent the forward end of the burner 8. From the forward end of the burner 8 the flame travels rearwardly along the burner until the whole burner is ignited. Gas to the constantly burning ignition pilot burner 18 is supplied through the safety control 15 and a pipe 19. The safety control 15 is so constructed that it will automatically cut off the supply of gas to the cock 13, and consequently the burner 8, and to the ignition pilot burner 18 in the event the ignition pilot burner 18 becomes extinguished for any reason. The operation of the safety control 15 is controlled by a thermocouple 20 against which a small flame from the ignition pilot burner 18 is constantly directed while the ignition pilot burner is burning. In order to re-light the ignition pilot burner 18 after it has once been extinguished, it is necessary to manually depress the button 21 to supply gas to the ignition pilot burner and to manually ignite the pilot light 18 by suitable means. It is also necessary to hold the button 21 depressed until the small flame from the ignition pilot burner causes the thermocouple 20 to actuate the safety control to again supply gas to the burner 8 through the cock 13.

The thermostatically operated valve unit 14 is controlled by a thermostatic element 22 disposed within the oven 2, and is operative to maintain the temperature of the oven at a predetermined degree, which may be set by a knob 23.

In order that one may see at a glance whether or not the oven burner is operating I provide a visual indicating mechanism which includes an electric bulb 24 mounted in a case 25 which is secured to the splash-back 7ª. The bulb 24 is adapted to be energized when the burner is operating and de-energized when the burner is not operating. In order to control the energization of the bulb 24 I provide a switch 26 which is opened and closed by the operation of a thermostatic element 27 and is electrically connected to a source of power and to the bulb 24 by conductors 26ª. The switch 26 and element 27 are mounted upon a bracket 28 which is rigidly secured to the broiler wall adjacent the rear end of the burner 8. The thermostatic element is adapted to be heated by an indicating pilot burner 29 which is disposed adjacent the rear end of the burner 8 and arranged to be ignited by the burner 8 and to project a small flame against the thermostatic element 27. Gas is supplied to the indicating pilot burner 29 through a small tube 30 connected to the pipe 31 between the cock 13 and the unit 14.

Assuming that the ignition pilot burner 18 is burning, the operation of the device is as follows: The thermostatically operated valve unit 14 is set by the knob 23 to maintain the oven temperature desired and the cock 13 is opened. Gas will then flow from the manifold through the safety control 15, cock 13, unit 14, and mixing tube 10 into the burner 8. At the forward end of the burner 8 the gas is ignited by the ignition pilot burner 18. The flame will travel rearwardly along the burner and when it reaches the rear end thereof will ignite the indicating pilot burner 29. The indicating pilot burner 29 will then heat the thermostatic element 27 which, after being heated sufficiently, will close the switch 26 and energize the bulb 24, to indicate that the burner 8 is operating. If during the use of the oven the ignition pilot burner 18 should be extinguished for any reason the safety control will operate to cut off the supply of gas to both the oven burner 8 and the indicating pilot burner 29. The bulb 24 will then be de-energized by the opening of the switch 26 when the thermostatic element 27 cools. This will indicate that the ignition pilot burner 18 has been extinguished and will have to be re-lighted as hereinbefore explained before the oven burner can again operate. When it is desired to discontinue the heating of the oven the cock 13 is turned to cut off the supply of gas to the oven burner 8 and indicating pilot burner 29. The bulb 24 is then de-energized as the thermostatic element 27 cools, indicating that the burner 8 is no longer operating.

Figure 6:
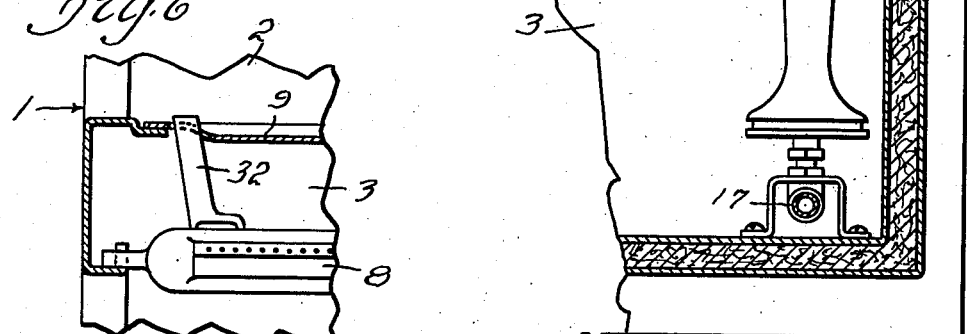
Fig. 6 is a detail sectional view showing a modification in which the burner is manually ignited through an ignition tube.
Figure 3:
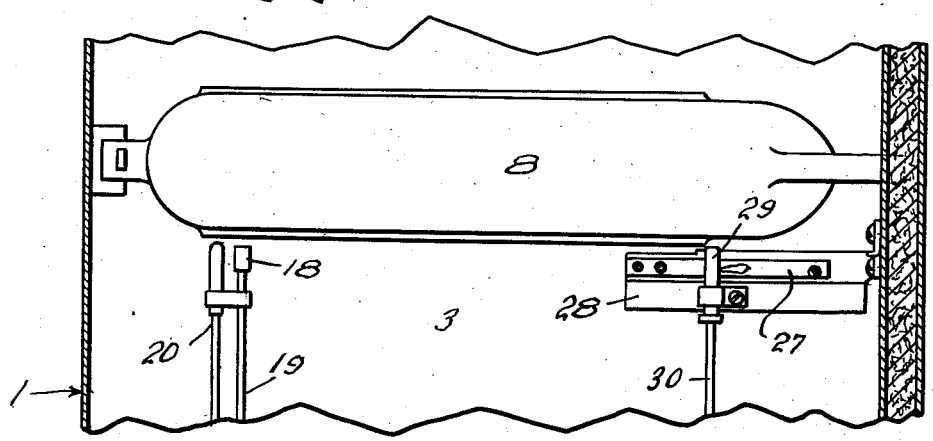
Fig. 3 is a horizontal section taken on the line 3—3 of Fig. 2.

In the form shown in Fig. 6 the ignition pilot burner 18 is eliminated and the burner 8 is manually ignited through an ignition tube 32 which extends from the forward end of the burner 8 up through the oven bottom 9. When the ignition pilot burner 18 is dispensed with the safety control is also eliminated so that gas flows from the manifold directly to the cock 13. The rest of the apparatus and the operation thereof is the same as that previously described. In this form the indicating pilot burner 29 also acts as a safety ignition pilot burner to re-light the burner 8 should it be extinguished for any reason during operation.

From the foregoing it will be apparent that I have provided a very simple and efficient apparatus for carrying out the objects of my invention, and it is to be understood that I am not limited to the specific construction shown and described herein as various modifications can be made thereto within the scope of the appended claims.

Having thus described my invention, I claim:

1. An apparatus of the character described comprising an elongated gaseous fuel oven burner, an electric indicator bulb remote from said oven burner, ignition means by which said oven burner is ignited disposed adjacent one end of said oven burner, means including a switch operative when closed to effect energization of said electric bulb, a thermostatic element operative when heated to close said switch, and an indicating pilot burner mounted adjacent the other end of said oven burner in position to be ignited by said oven burner and to project a flame against said thermostatic element and maintain said thermostatic element heated during normal operation of said oven burner, said indicating pilot burner burning constantly during the continuous normal operation of said oven burner.

2. An apparatus of the character described comprising an elongated gaseous fuel oven burner, an electric indicator bulb remote from said oven burner, ignition means by which said oven burner is ignited disposed adjacent one end of said oven burner, means including a switch operative when closed to effect energization of said electric bulb, a thermostatic element operative when heated to close said switch, an indicating pilot burner mounted adjacent the other end of said oven burner in position to be ignited by said oven burner and to project a flame against said thermostatic element and maintain said thermostatic element heated during normal operation of said oven burner, said indicating pilot burner burning constantly during the continuous normal operation of said oven burner, and a valve by which the supply of gas to said oven burner and said indicating pilot burner is simultaneously turned on and off.

3. An apparatus of the character described comprising an oven, an elongated gaseous fuel oven burner, a constantly burning ignition element by which said oven burner is ignited disposed adjacent one end of said oven burner, an electric indicator bulb remote from said oven burner, means including a switch operative when closed to effect energization of said bulb, a thermostatic element operative when heated to close said switch, an indicating pilot burner mounted adjacent the other end of said oven burner in position to be ignited by said oven burner and to project a flame against said thermostatic element and maintain said thermostatic element heated during normal operation of said oven burner, said indicating pilot burner burning constantly during the continuous normal operation of said oven burner, a manually operable valve by which the supply of gas to said oven burner and said indicating pilot burner is simultaneously turned on and off, and a safety control mechanism operative to automatically cut off the supply of gas to said oven burner, said ignition element and said indicating pilot burner in the event said ignition element is extinguished.

4. An apparatus of the character described comprising an oven, an elongated gaseous fuel oven burner, a constantly burning ignition element by which said oven burner is ignited disposed adjacent one end of said oven burner, an electric indicator bulb remote from said oven burner, means including a switch operative when closed to effect energization of said bulb, a thermostatic element operative when heated to close said switch, an indicating pilot burner mounted adjacent the other end of said oven burner in position to be ignited by said oven burner and to project a flame against said thermostatic element and maintain said thermostatic element heated during normal operation of said oven burner, said indicating pilot burner burning constantly during the continuous normal operation of said oven burner, a manually operable valve by which the supply of gas to said oven burner and said indicating pilot burner is simultaneously turned on and off, and a thermally operated valve responsive to the oven temperature and operative to regulate the flow of gas to said oven burner in order to maintain a predetermined set temperature in said oven during normal operation of said oven burner.

5. An apparatus of the character described comprising an oven, a gaseous fuel oven burner, ignition means by which said oven burner is ignited, an electric indicator bulb remote from said oven burner, means including a switch operative when closed to effect energization of said bulb, a thermostatic element operative when heated to close said switch, and an indicating pilot burner spaced from said ignition means and mounted in position to be ignited by said oven burner and to project a flame against said thermostatic element and maintain said thermostatic element heated during normal operation of said oven burner, said indicating pilot burner burning constantly during the continuous normal operation of said oven burner.

6. An apparatus of the character described comprising an oven, a gaseous fuel oven burner, ignition means by which said oven burner is ignited, an electric indicator bulb remote from said oven burner, means including a switch operative when closed to effect energization of said bulb, a thermostatic element operative when heated to close said switch, an indicating pilot burner spaced from said ignition means and mounted in position to be ignited by said oven burner and to project a flame against said thermostatic element and maintain said thermostatic element heated during normal operation of said oven burner, said indicating pilot burner burning constantly during the continuous normal operation of said oven burner, a manually operable valve by which the supply of gas to said oven burner and said indicating pilot burner is simultaneously turned on and off, and a thermally operated valve responsive to the oven temperature and operative to regulate the flow of gas to said oven burner in order to maintain a predetermined set temperature in said oven during normal operation of said oven burner.

CHARLES M. MAYER.

References Cited in the file of this patent

UNITED STATES PATENTS

| Number | Name | Date |
|---|---|---|
| 2,055,384 | Meacham | Sept. 22, 1936 |
| 2,195,903 | Roberts et al. | Apr. 2, 1940 |
| 2,361,530 | Burch | Oct. 30, 1944 |